US007974300B2

(12) United States Patent
Broadhurst et al.

(10) Patent No.: US 7,974,300 B2
(45) Date of Patent: Jul. 5, 2011

(54) CONFIGURATION FOR MESSAGING MULTIPLEXED CHANNEL INSTANCES WITH VARYING CONNECTION SPEEDS

(75) Inventors: Peter A. Broadhurst, Hampshire (GB);
Paul G. Clarke, Hampshire (GB);
Michael Horan, Hampshire (GB);
Jitendra K. A. Patel, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 12/248,087

(22) Filed: Oct. 9, 2008

(65) Prior Publication Data

US 2010/0091788 A1   Apr. 15, 2010

(51) Int. Cl.
*H04J 3/16* (2006.01)
(52) U.S. Cl. ....................................... 370/437; 370/252
(58) Field of Classification Search .................. 370/230, 370/252, 400, 401, 437, 465, 468
See application file for complete search history.

(56) References Cited

U.S. PATENT DOCUMENTS

| 5,926,458 | A  |   | 7/1999  | Yin              |         |
|-----------|----|---|---------|------------------|---------|
| 5,935,215 | A  |   | 8/1999  | Bell et al.      |         |
| 5,991,892 | A  | * | 11/1999 | Honda            | 714/4   |
| 6,189,025 | B1 |   | 2/2001  | Ogura et al.     |         |
| 6,359,883 | B1 |   | 3/2002  | Lechleider       |         |
| 7,120,697 | B2 |   | 10/2006 | Aiken, Jr. et al.|         |
| 7,277,385 | B2 | * | 10/2007 | Kinnunen         | 370/230 |
| 7,542,784 | B2 | * | 6/2009  | Passier et al.   | 455/557 |
| 2002/0150099 | A1 | * | 10/2002 | Pung et al.    | 370/390 |
| 2002/0172175 | A1 |   | 11/2002 | Okamura        |         |
| 2005/0286415 | A1 |   | 12/2005 | Guo            |         |
| 2007/0136476 | A1 | * | 6/2007  | Rubinstein     | 709/227 |
| 2008/0285508 | A1 | * | 11/2008 | Low et al.     | 370/329 |
| 2009/0241176 | A1 | * | 9/2009  | Beletski et al.| 726/7   |

FOREIGN PATENT DOCUMENTS

| GB | EP 0 733 971 A2 | 9/1996 |
| WO | WO 01/22663 A1  | 3/2001 |
| WO | WO 01/48976 A2  | 7/2001 |

OTHER PUBLICATIONS

Office Action dated Jan. 5, 2011 from corresponding U.S. Appl. No. 12/248,069.

* cited by examiner

*Primary Examiner* — Ricky Ngo
*Assistant Examiner* — Christine Ng
(74) *Attorney, Agent, or Firm* — Scully, Scott, Murphy & Presser, P.C.; Jeanine Ray, Esq.

(57) ABSTRACT

A method, system and article of manufacture are disclosed for selecting a channel instance for connecting a client with a server in a multi-channel instance computer system. In this computer system, when a new channel instance is used for connecting the client with one of the servers, defined channel information is established for the channel instance. The method of this invention comprises the steps of, when a new connection request is made, locking existing channel information; and after said locking, scanning through a list of channel connections for one of the channel instances that is a candidate for said connection request. In response to finding a candidate channel instance, which is in the process of connecting, the connection request is queued against the candidate channel instance. When the candidate channel instance does not complete connecting within a defined or determined time period, a new channel instance is used for the connection request.

20 Claims, 4 Drawing Sheets

CONFIGURATION FOR MESSAGING MULTIPLEXED CHANNEL INSTANCES WITH VARYING CONNECTION SPEEDS

CROSS REFERENCE TO RELATED APPLICATIONS

The present application is related to concurrently filed U.S. patent applications Ser. No. 12/246,069 for "Efficient Selection Of A Messaging Multiplexed Channel instance," and Ser. No. 12/248,078 for "A Flexible Algorithm For Quiescing Multiplexed Client Messaging Conversations," the disclosures of which are herein incorporated by reference as if set forth fully herein.

BACKGROUND OF THE INVENTION

1. Field of the Invention

This invention generally relates to distributed multi-channel instance computer systems, and more specifically, to a configuration for messaging multiplexed channel instances with varying connection speeds in such systems.

2. Background Art

Distributed computing systems are in common use today, as they offer many important advantages, including large capacity, quick response, distributed workloads, high reliability and extensive resources and functionalities. In these systems, a number of client applications, running on one or more client computers or stations, communicate with a number of server applications, running on one or more server computers.

A number of communications channel instances are provided for handling the communications between the client and server applications; and when a client application requests access to a server application, one of those channel instances is selected to handle the communications traffic between the two applications. With current technology, a single channel instance can handle communications in both directions between a client and a server, and, in fact, one channel instance can handle communications in both directions between multiple clients and a server. This technology increases very substantially the amount of communications that can be handled by a given number of channel instances.

When single channel instances handle communications between plural clients and a server, selecting the appropriate channel instance for the communications between a client and a server may be difficult because different communication streams require different protocols. Once a specific protocol is established for a given channel instance; only communications that can be handled using that protocol can be added to that channel instance.

Application connections from a messaging client may be multiplexed over a single communications channel instance, such as a TCP/IP socket. The first application connection on a particular channel instance causes the protocol set-up (e.g. socket) flows to occur, which are followed by other flows which determine the nature of the connectivity on that messaging channel instance/socket. For instance, the value of a messaging heartbeat interval may be negotiated at this stage (the heartbeat being sent on an idle channel instance to check for connectivity problems). Another example of these subsequent flows may involve an SSL handshake, which allows for mutual authentication of the parties at both ends of the channel instance, and sets up algorithms for subsequent data encryption and data hashing.

Subsequent application connections can only multiplex on to a particular channel instance if the channel instance characteristics, such as SSL connectivity, specified for the connection match those specified on that channel instance. They can also only multiplex on to a channel instance if that channel instance supports multiplexing and has not reached its multiplexing limit. So once the first connection on the channel instance has completed its connection flows, a new matching connection will multiplex with it provided that the channel instance is configured to support multiplexing after its initial flows are complete.

The problem with this scenario is that while channel instances are first connecting there can be a significant delay, for instance SSL negotiation is very processing-intensive, slow lines may be involved to transmit the negotiation flows, overloaded systems may not respond promptly, connection attempts to invalid destinations can be particularly lengthy. If an attempt is made to make a new connection with characteristics which match one which is still in the process of connecting, it is impossible to tell immediately whether this can be multiplexed on this channel instance or not.

U.S. patent application Ser. No. 12/248,069, for "Method and System For Efficient Selection Of A Messaging Multiplexed Channel instance," filed herewith, describes the behavior of a new connection attempt in a multiplexed messaging system which matches an existing communications channel instance which is in the process of establishing its initial connection. Providing it does not exceed a predetermined multiplexing limit for that channel instance, the new connection attempt is queued waiting for the channel instance to complete its initial flows, at which stage the waiting connection is prompted to search for a channel instance to multiplex on again, and in general it will use the newly connected channel instance.

With this procedure, the particular waiting connection may be subject to delays, such that the queued new connections are kept waiting for a time, when instead they could move on to a new channel instance instance/socket and connect on that. In many systems this is probably not an important issue and the approach described in U.S. patent application Ser. No. 12/246,069 provides excellent results. Moving on to a new channel instance instance/socket tends to reduce the level of multiplexing, and in many systems the new channel instance will attempt to connect across the same network path to the same remote destination using the same connection flows (e.g. SSL) and so probably will not be any quicker than the one the new connection was waiting on.

In some systems, however, new channel instance instance/socket connection attempts may vary greatly in their connection speed. This can happen even when the channel instances are attempting to connect to the same remote system if a complex routing configuration, potentially involving slow lines, lies between the two systems. It is even more likely in a workload balancing situation, in which the channel instances are routed to several different, identical server systems, and which may involve routing connection flows over quite different communications networks to reach one remote server rather than another.

One possible approach to this problem would be to impose a fixed system-specified time-out when a new connection is queued waiting to multiplex, after which it moves on to connect on a new channel instance.

This does improve the situation in the case of excessive delays, but has the clear drawback that it has to be chosen for the average case. In some systems with very fast connectivity, an average delay will be regarded as unacceptable. In other systems, long connection times may be the norm, so with this approach switching to a new channel instance might occur when the original connection attempt was still progressing normally.

SUMMARY OF THE INVENTION

An object of this invention is to improve procedures for selection of a messaging multiplexed channel instance in a distributed computing environment.

Another object of the present invention is to provide in a distributed computing environment, a configuration for messaging multiplexed channel instances with varying connection speeds.

A further object of the invention is to provide a parameter, which may be user controlled or system controlled, that is used, in a multi-socket, distributed messaging system, to specify the time for which an application connection attempt will wait on a matching connecting multiplexing channel instance before that connection attempt switches to a new channel instance of its own.

These and other objectives are attained with a method, system and article of manufacture for selecting a channel instance for connecting a client with a server in a multi-socket computer system including one or more clients, a multitude of servers and a multitude of channel instances for connecting the clients with the servers. In this computer system, when a new channel instance is used for connecting one of the clients with one of the servers, defined channel instance information is established for said new channel instance. The method of this invention comprises the steps of, when a new connection request is made, locking existing channel instance information; and after said locking, scanning through a list of channel instance connections for one of the channel instances that is a candidate for said new connection request.

In response to finding a candidate channel instance, the new connection request is queued against the candidate channel instance, wherein the candidate channel instance is in the process of connecting. When the candidate channel instance does not complete connecting within a defined time period, using a new channel instance for the new connection request.

With one embodiment of the invention, the user is provided with a parameter which is used to specify the time for which an application connection attempt will wait on a matching connecting multiplexing channel instance before it switches to a new channel instance of its own. This allows a system in which matching channel instances may connect to remote systems at different speeds to be configured so that channel instances do not delay unnecessarily when queued up to multiplex behind a channel instance connection which is significantly delayed when compared with the normal delay for such a system.

In another embodiment, instead of a user providing this parameter, the system could keep a record of the average connection time required across its connecting channel instances and could autonomically calculate its own timeout based on that, which, for instance, could be set to twice the average connection time.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
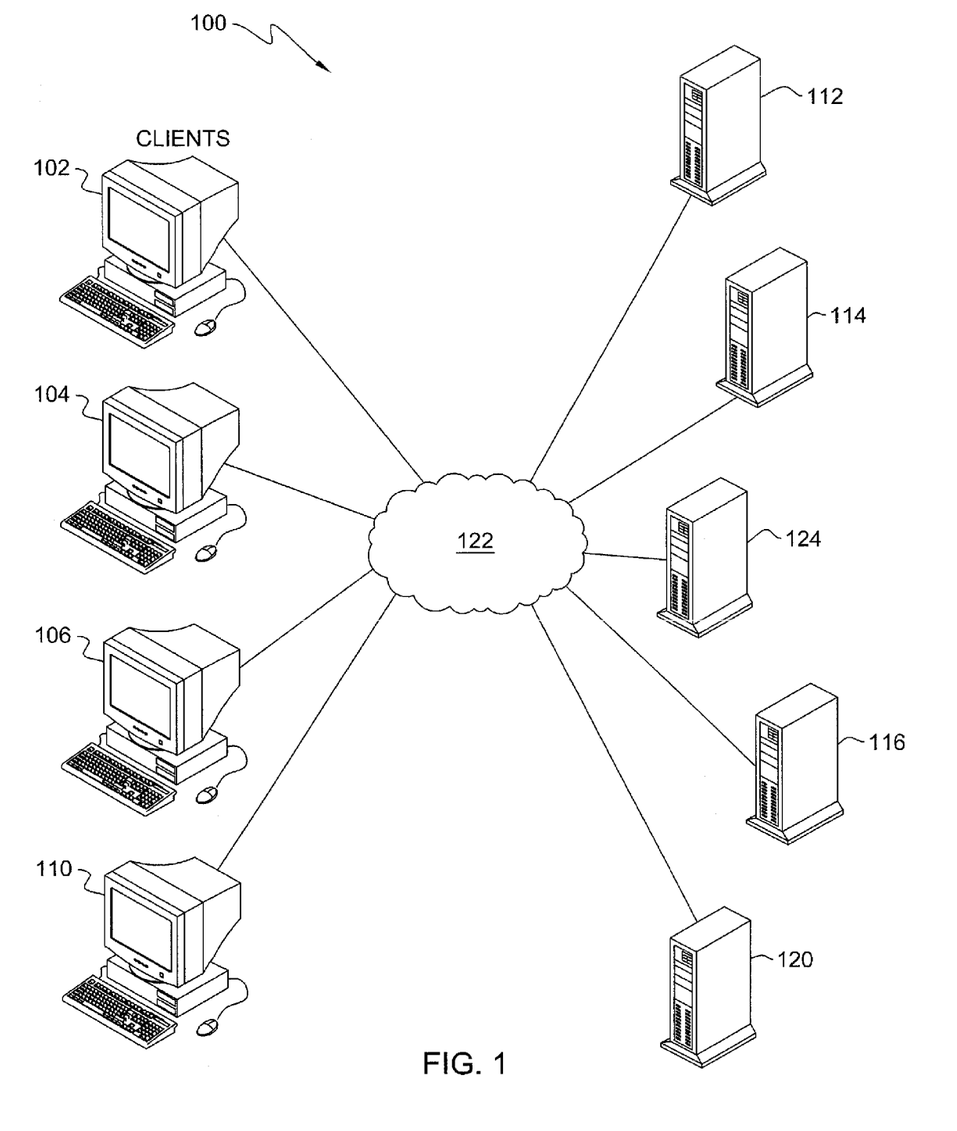
FIG. 1 illustrates a distributed computing environment in which the present invention may be practiced.

FIG. 1 shows a distributed computing system 100 including clients 102, 104, 106 and 110, and servers 112, 114, 116 and 120. The clients communicate over network 122 with a distributing processor 124 that performs workload management and distributes communications for connection to the servers. The distributing processor 124 may also function as a server and, thus, may be the endpoint of communications with the clients.

In operation, when the distributing processor 124 receives communications requests from the clients, the distributing processor routes those communications to appropriate ones of the servers, and establishes communications channel instances between the clients and the servers. These communication channel instances need not go through the distributing processor. Each of these channel instances preferably can carry communications in both directions between a client and a server and can also carry communications between plural or multiple clients and a server.

Application connections from a messaging client may be multiplexed over a single communications channel instance, such as a TCP/IP socket. The first application connection on a particular channel instance causes the protocol set-up (e.g. socket) flows to occur, which are followed by other flows which determine the nature of the connectivity on that messaging channel instance instance/socket. For instance, the value of a messaging heartbeat interval may be negotiated at this stage (the heartbeat being sent on an idle channel instance to check for connectivity problems). Another example of these subsequent flows may involve an SSL handshake, which allows for mutual authentication of the parties at both ends of the channel instance, and sets up algorithms for subsequent data encryption and data hashing. As discussed below, in the preferred embodiment of this invention, the level and presence of multiplexing on this channel instance is another item which is negotiated in these flows.

Subsequent application connections can only multiplex on to a particular channel instance if the channel instance characteristics, such as SSL connectivity, specified for the connection match those specified on that channel instance. They can also only multiplex on to a channel instance if that channel instance supports multiplexing and has not reached its multiplexing limit. So once the first connection on the channel instance has completed its connection flows, a new matching connection will multiplex with it provided that the channel instance is configured to support multiplexing after its initial flows are complete.

With the procedure discussed in the above-identified U.S. patent application Ser. No. 12/248,069, existing channel instance information is not locked while each new channel instance connects, and instead, existing channel instance information is locked when a new connection request is made. Once locked, a search is made for a matching channel instance which is not full. If one is found and it is not in the process of connecting, the new connection request is multiplexed on to it. If it does not find such a channel instance at all, a new channel instance is started. But in the case where it does not find a matching channel instance to multiplex on to immediately, but instead finds a matching channel instance which is still connecting, this application connection is queued with others which may be waiting on this connection.

A check is made in case too many such application connections are queued: would a previously negotiated multiplexing limit be exceeded if another connection were multiplexed on to this channel instance? If it would be, a new channel instance is started. If the channel instance connection attempt succeeds, the waiting application connections are informed of this completion state, relock and rescan the channel instance information. In general, these waiting applications end up successfully and immediately multiplexing on the newly connected channel instance.

Generally, in accordance with the present invention, the user is provided with a parameter which is used to specify the time for which an application connection attempt will wait on a matching connecting multiplexing channel instance before it switches to a new channel instance of its own. This allows a system in which matching channel instances may connect to remote systems at different speeds to be configured so that application connection attempts do not delay unnecessarily when queued up to multiplex behind a channel instance connection which is significantly delayed when compared with the normal delay for such a system.

In another embodiment, instead of a user providing this parameter, the system could keep a record of the average connection time required across its connecting channel instances and could autonomically calculate its own timeout based on that, which, for instance, could be set to twice the average connection time.

In one embodiment of the invention, the messaging configuration allows the user to specify the number of seconds that an application connection should wait to multiplex with a matching channel instance which is in the process of connecting. The thread associated with the new connection is queued waiting for the connection attempt on the matching channel instance to complete. But it is also associated with a timer which prompts the thread if the user-specified time-out expires first. If this happens, the relevant entry in the list of connected channel instances is marked with a flag to indicate it is taking too long. Channel instances marked with this flag are passed over during subsequent scans. The thread then relocks the list of channel instances and rescans for a matching entry.

In the autonomic implementation of this timeout, the system at first makes a guess at the average channel instance connection time. Once the first connection is made its channel instance connection time is used to replace the guess. This is averaged with subsequent values (a count of channel instance connections currently included in the average is maintained) until the average remains relatively static when new connections are added. At any point, a multiple of the current average is used for the timeout, for instance twice the average.

Figure 2:
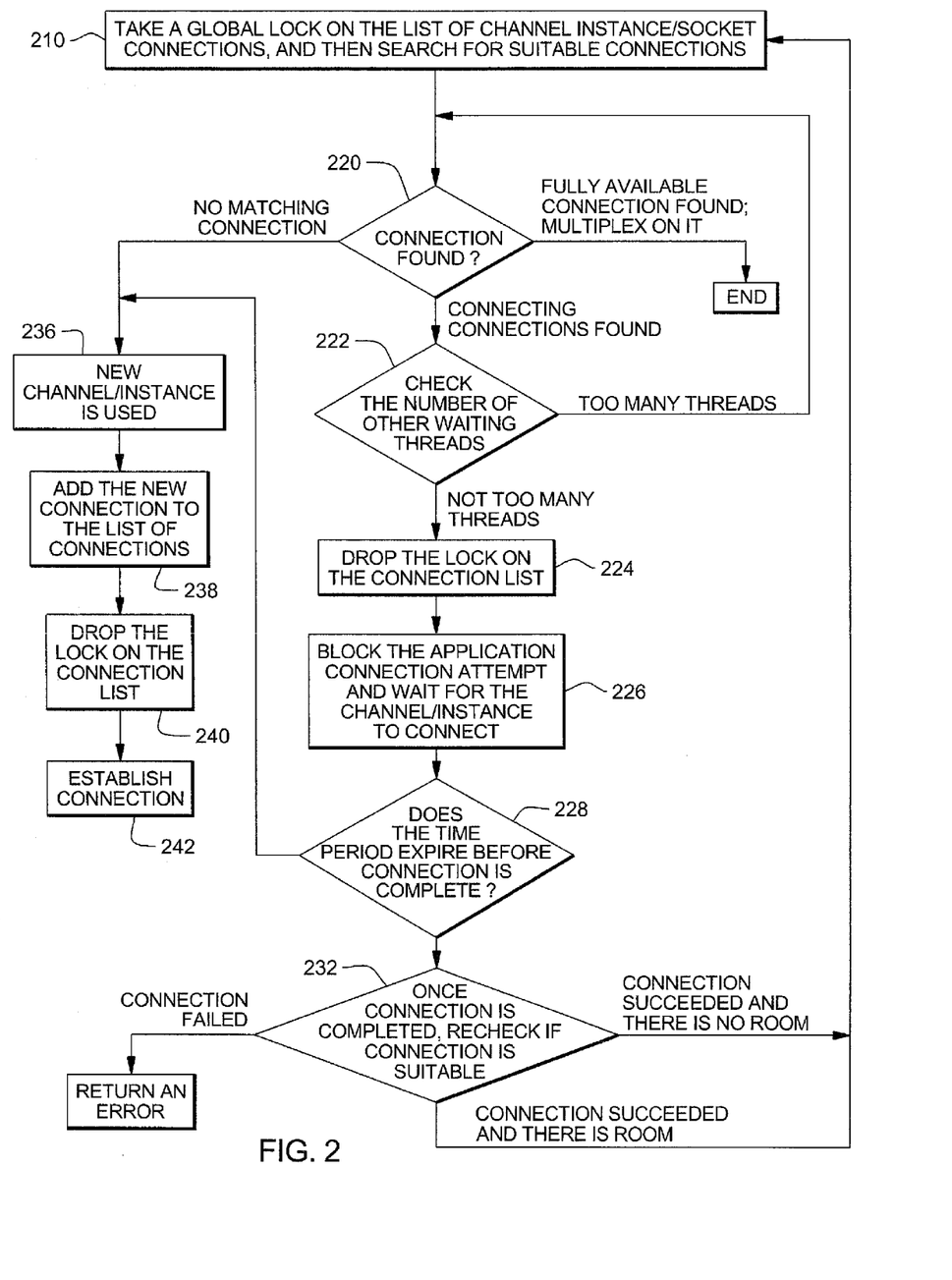
FIG. 2 shows a preferred algorithm for implementing this invention.

FIG. 2 generally shows a preferred algorithm for implementing this invention. At step 210, a global lock is taken on the list of channel instance/socket connections. This list is then searched for suitable connections. For each connection, one of the following results can be observed: (i) not matching; (ii) matching, but the channel instance/socket connection failed or has been disconnected; (iii) matching, connected and available; (iv) matching, but full; and (v) matching, but the attempt to connect the channel instance/socket is not yet complete.

In cases (i) and (ii), the algorithm moves onto the next channel instance instance/socket connection on the list. In the case of result (iii), the request will subsequently be multiplexed on to the matching channel instance. Result (iv) occurs if all possible slots for multiplexed connections have been used. A variable is held which contains the number of application connections a full channel instance/socket contains. If multiple full entries matching these channel's details are found, the lowest value is held. If all possible slots for multiplexed connections have been used, the algorithm moves on to the next channel instance/socket connection on the list. In case of result (v), this connection is added to a list of possible channel instance/socket connections.

Step 220 is to decide whether a suitable connected channel instance/socket has been found. If no connection was found, which can be immediately used, and a list of possible connecting channel instance/socket connections exists, then the following steps are performed.

At step 222, if connection attempts which were still connecting were found in step 210, then the algorithm checks the number of other threads that are waiting for this connection to complete. A positive outcome—there are not too many threads waiting at the moment—leads to box 224. A negative outcome—there are too many threads waiting at the moment—leads to this channel instance being removed from the list of possible connecting channel instance/socket connections, and the flow returns to box 220. We may have more possible connecting channel instance/socket connections, in which case the flow subsequently returns to box 222, but if we do not have any more possible connecting channel instance/socket connections, the flow then goes to box 236.

At step 224, if waiting for this connection to complete, the lock on the connection list is dropped before blocking. If this stage is reached, the algorithm does not continue without returning to the beginning of the logic to regain the lock.

At step 226, the application connection attempt is blocked and the algorithm waits for the channel instance to connect. At step 228, if the time limit expires, the algorithm proceeds to step 236, where a new channel instance is executed for the connection attempt. If, however, the connection completes before the defined time limit expires, the algorithm proceeds to step 232. At this step, all the threads that are waiting for the channel instance/socket connection to complete when posted are awoken.

Also, once complete, at step 232, the algorithm rechecks if this channel instance/socket connection is suitable. One of three results can occur: (a) connected and available; (b) connection failed; (c) channel instance is full. If the channel instance is connected and available, then the algorithm returns to step 210 to rescan, with the likelihood that the connection will multiplex on to this channel instance. If the connection failed, a failure notification is returned to the application. A connection can be full if there was no previous full connection from which to choose how many threads to block, or if the number of multiplexing slots has been altered on the remote end of the channel instance and has been renegotiated to a value which will not leave room for this connection to start. If this is the case, the algorithm updates the lowest full variable as necessary, and returns to 210 to rescan.

If, at step 220, no suitable fully available nor in progress connection was found, then the algorithm proceeds from step 220 to step 236 and a new channel instance/socket is created to the remote server using the following steps. At step 238, the new channel instance/socket connection is added to the list of these connections. At step 240, the lock on the list of connections is dropped, so that other threads can perform connection attempts, or block on completion of this connection. Then, at step 242, the channel instance/socket to the remote end of the connection is established.

The preferred embodiment of the invention provides a number of important advantages. One important advantage is that if a connection attempt is taking to long, the process, after a configurable amount of time, moves on before the connection has succeeded.

Figure 3:
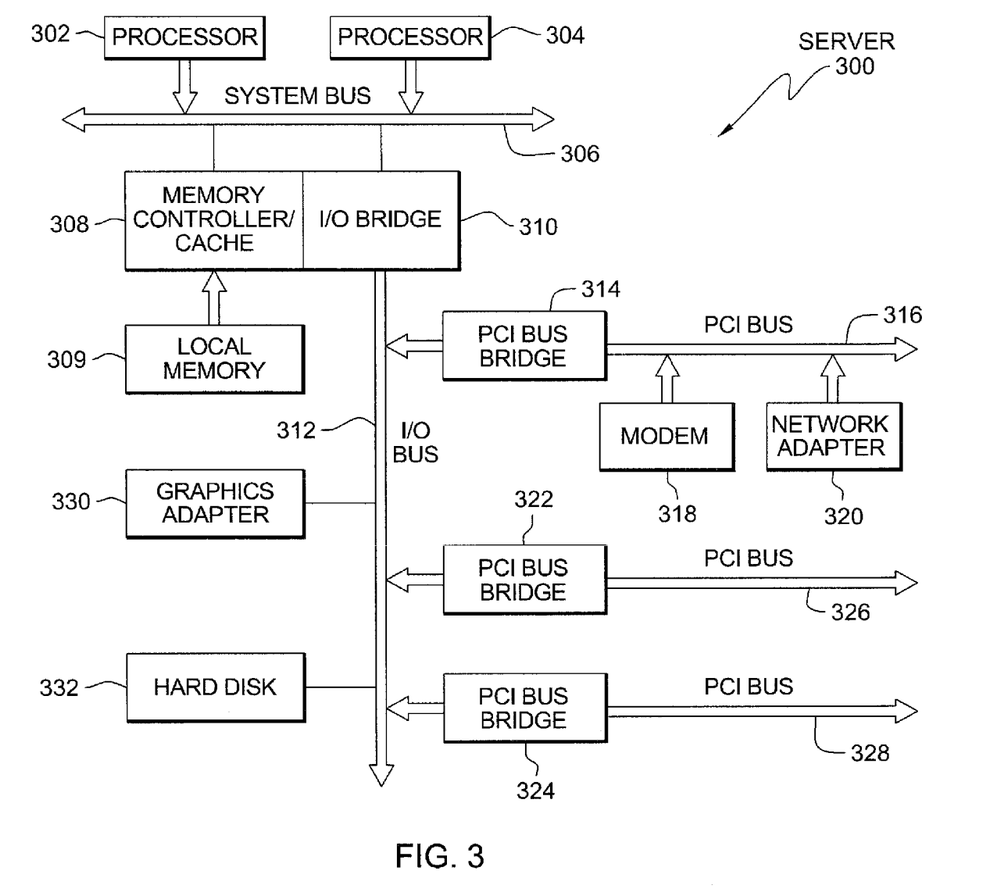
FIG. 3 is a block diagram illustrating a data processing system that may be implemented as a server in the environment of FIG. 1.

Referring to FIG. 3, a block diagram depicts a data processing system that may be implemented as a server, such as server 104 in FIG. 1, in accordance with the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 316 connected to I/O bus 312 provides an interface to PCI local bus 316. A number of modems 318-320 may be connected to PCI bus 316. Typical PCI bus implementations support four PCI expansion slots or add-in connectors. Communications links to network computers in FIG. 1 may be provided through modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, server 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition or in place of the hardware depicted. The depicted example is not meant to imply architectural limitations with respect to the present invention.

The data processing system depicted in FIG. 3 may be, for example, an IBM RISC/System 6000, a product of International Business Machines Corporation in Armonk, N.Y., running the Advanced Interactive Executive (AIX) operating system.

Figure 4:
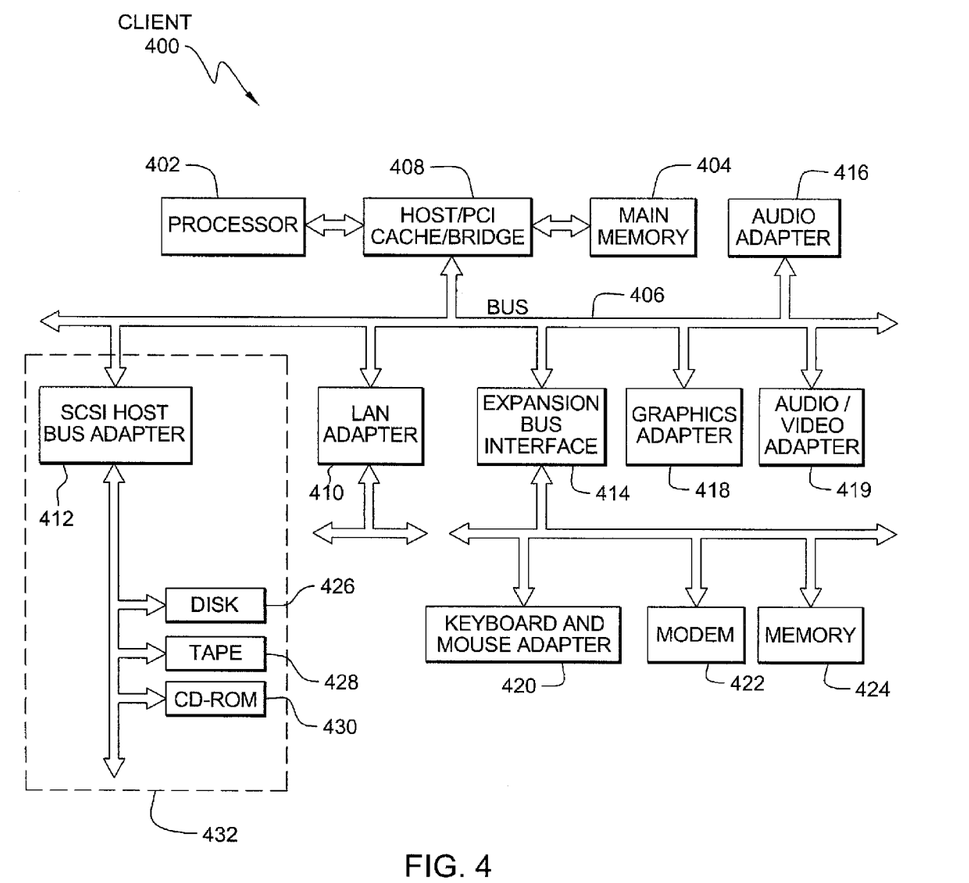
FIG. 4 is a block diagram depicting a data processing system that may be implemented as a client in the environment of FIG. 1.

With reference now to FIG. 4, a block diagram illustrates a data processing system that may be implemented as a client, such as client 108 in FIG. 1, in accordance with the present invention. Data processing system 400 is an example of a client computer. Data processing system 400 employs a peripheral component interconnect (PCI) local bus architecture. Although the depicted example employs a PCI bus, other bus architectures, such as Micro Channel and ISA, may be used. Processor 402 and main memory 404 are connected to PCI local bus 406 through PCI bridge 408. PCI bridge 408 also may include an integrated memory controller and cache memory for processor 402.

Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. SCSI host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system. An object oriented programming system such as Java may run in conjunction with the operating system and provides calls to the operating system from Java programs or applications executing on data processing system 400. "Java" is a trademark of Sun Microsystems, Inc. Instructions for the operating system, the object-oriented operating system, and applications or programs are located on storage devices, such as hard disk drive 426, and may be loaded into main memory 304 for execution by processor 402.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 400, if optionally configured as a network computer, may not include SCSI host bus adapter 412, hard disk drive 426, tape drive 428, and CD-ROM 430, as noted by dotted line 432 in FIG. 4, denoting optional inclusion. In that case, the computer, to be properly called a client computer, must include some type of network communication interface, such as LAN adapter 410, modem 422, or the like. As another example, data processing system 400 may be a stand-alone system configured to be bootable without relying on some type of network communication interface, whether or not data processing system 400 comprises some type of network communication interface. As a further example, data processing system 400 may be a Personal Digital Assistant (PDA) device which is configured with ROM and/or flash ROM in order to provide non-volatile memory for storing operating system files and/or user-generated data.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments

What is claimed is:

1. A method of selecting a channel instance for connecting a client with a server in a multi-channel computer system including one or more clients, a multitude of servers and a multitude of channel instances for connecting the clients with the servers, and wherein when a new channel instance is used for connecting one of the clients with one of the servers, defined channel information is established for said new channel instance, the method comprising the steps of:
- when a new application connection request is made from one of the clients, locking existing channel information;
- after said locking, scanning through a list of channel connections for one of the channel instances that is a candidate for said new application connection request;
- in response to finding a candidate channel instance, queuing the new application connection request against the candidate channel instance, wherein the candidate channel instance is in the process of connecting one of the clients and one of the servers;
- determining a number of other application connection requests in the process of connecting to the candidate channel instance;
- based on said number, continuing or discontinuing with said process of connecting the new application connection request on to the candidate channel instance; and
- when the candidate channel instance does not complete connecting said one of the clients and said one of the servers within a defined time period, unqueuing said new application connection request against the candidate channel instance, and using a new channel instance for the new application connection request.

2. The method according to claim 1, wherein the defined time period is set by a user of the computer system.

3. The method according to claim 1, wherein the defined time period is set by the computer system.

4. The method according to claim 1, wherein the defined time period is based on an average connection time for the channel instances in the computer system.

5. The method according to claim 4, wherein the defined time period is greater than said average connection time.

6. The method according to claim 1, wherein the defined time period is initially selected by the computer system in a defined manner.

7. The method according to claim 6, wherein the defined time period is adjusted over time by the computer system.

8. The method according to claim 7, wherein the defined time period is adjusted by the computer system until a defined criterion is met.

9. The method according to claim 7, wherein the defined time period is adjusted based on an average connection time for the channel instances in the computer system.

10. The method according to claim 1, comprising the further step of, when the candidate channel instance completes connecting within the defined time period, rescanning through the list of channel connections for one of the channel instances that is a candidate for said new connection request.

11. The method according to claim 1, wherein:
- a plurality of threads are waiting for the new connection request to complete; and
- the continuing with said process of connecting the new connection request includes when the new connection request completes before the defined time period expires, awakening all of said threads that are waiting for the new connection request to complete;
- when said number of other connection requests is above the given threshold, removing the candidate channel instance from said list of channel connections.

12. A channel instance selection system for selecting a channel instance for connecting a client with a server in a multi-channel instance computer system including one ore more clients, a multitude of servers and a multitude of channel instances for connecting the client with the servers, and wherein when a new channel instance is used for connecting one of the clients with one of the servers, defined channel instance information is established for said new channel instance, the channel selection system comprising at least one processing unit configured for:
- when a new application connection request is made from one of the clients, locking existing channel information;
- after said locking, scanning through a list of channel connections for one of the channel instances that is a candidate for said new application connection request;
- in response to finding a candidate channel instance, queuing the new connection application request against the candidate channel instance, wherein the candidate channel instance is in the process of connecting one of the clients and one of the servers;
- determining a number of other application connection requests in the process of connecting to the candidate channel instance;
- based on said number, continuing or discontinuing with said process of connecting the new application connection request on to the candidate channel instance; and
- when the candidate channel instance does not complete connecting said one of the clients and said one of the servers within a defined time period, unqueuing said new application connection request against the candidate channel instance, and using a new channel instance for the new application connection request.

13. The channel instance selection system according to claim 12, wherein the defined time period is set by a user of the computer system.

14. The channel instance selection system according to claim 12, wherein the defined time period is set by the computer system.

15. The channel instance selection system according to claim 12, wherein the defined time period is based on an average connection time for the channel instances in the computer system, and the defined time period is greater than said average connection time.

16. The channel instance selection system according to claim 12, wherein the defined time period is initially selected by the computer system in a defined manner, and the defined time period is adjusted over time by the computer system.

17. An article of manufacture comprising:
- at least one tangible computer readable storage device having computer readable program code logic tangibly stored therein to execute a machine instruction in a processing unit for selecting a channel instance for connecting a client with a server in a multi-channel instance computer system including one or more clients, a multitude of servers and a multitude of channel instances for connecting the clients with the servers, and wherein when a new channel instance is used for connecting one of the clients with one of the servers, defined channel instance information is established for said new channel instance, said computer readable program code logic, when executing, performing the following steps:

when a new application connection request is made from one of the clients, locking existing channel instance information;
after said locking, scanning through a list of channel connections for one of the channel instances that is a candidate for said new application connection request;
in response to finding a candidate channel instance, queuing the new application connection request against the candidate channel instance, wherein the candidate channel instance is in the process of connecting one of the clients and one of the servers;
determining a number of other application connection requests in the process of connecting to the candidate channel instance;
based on said number, continuing or discontinueing with said process of connecting the new application connection request on to the candidate channel instance; and
when the candidate channel instance does not complete connecting said one of the clients and said one of the servers within a defined time period, unqueuing said new application connection request against the candidate channel instance, and using a new channel instance for the new application connection request.

18. The article of manufacture according to claim 17, wherein the defined time period is set by a user of the computer system.

19. The article of manufacture according to claim 17, wherein the defined time period is set by the computer system.

20. The article of manufacture according to claim 17, wherein the defined time period is based on an average connection time for the channel instances in the computer system, and the defined time period is greater than said average connection time.

* * * * *